(No Model.)

C. C. JEROME.
TOE WEIGHT.

No. 484,022. Patented Oct. 11, 1892.

Witnesses
C. S. Nottingham
G. F. Downing

Inventor
C. C. Jerome
By H. A. Seymour
Attorney

UNITED STATES PATENT OFFICE.

CHARLES C. JEROME, OF CHICAGO, ILLINOIS.

TOE-WEIGHT.

SPECIFICATION forming part of Letters Patent No. 484,022, dated October 11, 1892.

Application filed April 23, 1892. Serial No. 430,405. (No model.)

*To all whom it may concern:*

Be it known that I, CHARLES C. JEROME, a resident of Chicago, State of Illinois, have invented certain new and useful Improvements in Toe-Weights; and I do hereby declare the following to be a full, clear, and exact description of the invention, such as will enable others skilled in the art to which it appertains to make and use the same.

My invention relates to an improvement in toe-weights, the object being to provide a device of simple construction and inexpensive to manufacture and adapted to be permanently secured to a horse's hoof independently of the shoe, and when so secured is adapted to receive removable weights of varying sizes or weights.

With this end in view my invention consists in certain novel features of construction and combinations of parts, as will be hereinafter more fully described, and pointed out in the claims.

Figure 1:
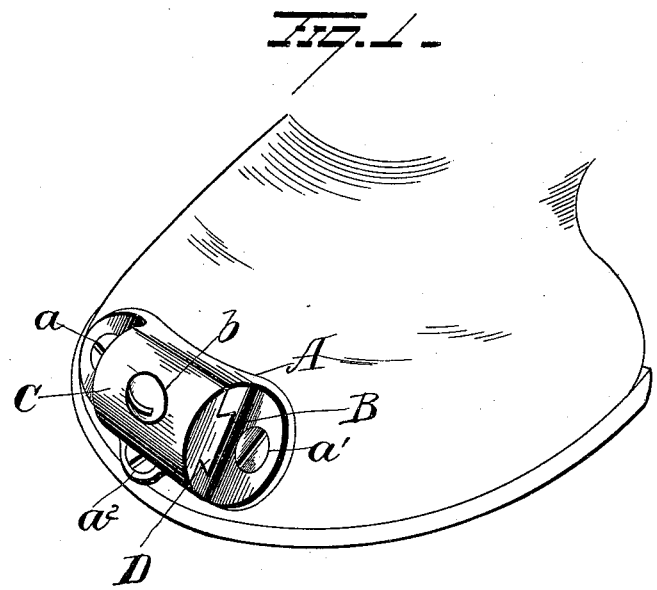
Figure 3:
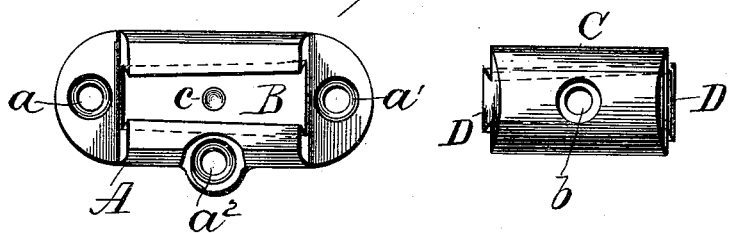
Figure 2:
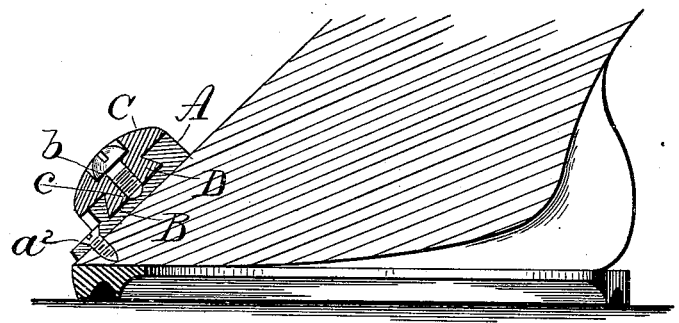

In the accompanying drawings, Figure 1 is a perspective view of my improved attachment secured to a horse's hoof. Fig. 2 is a cross-section, and Fig. 3 is a view of the parts detached.

A represents a thin plate constructed of any suitable material which will admit of its being shaped to conform to and fit closely the curvature of a horse's hoof, said plate being provided with a flat outer face having a horizontal dovetailed groove B, one end of which is smaller in diameter than the opposite end. The plate A is provided at suitable points with holes $a$ $a'$ $a^2$ for the reception of screws, by means of which the said plate is permanently fastened to the horse's hoof.

The weight C is provided longitudinally with a dovetailed tongue D, one end of which is of less diameter than its opposite end, or the tongue is so constructed that it will register with the horizontal dovetailed groove B, located in plate A. By constructing the tongue and groove in the manner described the weight is thereby prevented from passing beyond the end of the groove and also materially assists in locking said plate within the groove.

The weight C is provided centrally with an interiorly-screw-threaded hole $b$ for the reception of a screw, which latter enters a countersink $c$, located in plate A, whereby the weight is secured to the plate and endwise movement of the weight avoided.

By means of the tongue and groove the weight C can be removed from the plate A when desired and a lighter or heavier one substituted without the necessity of disturbing the plate A or removing the same from the horse's hoof.

In toe-weights heretofore used the weight is placed on a spur or tang elevated from the shoe or base of the hoof to any desired height, according to the length of the spur, the weight being in the shape of a half-ball and stands out on the hoof quite a distance from the hoof. Weights of this description are objectionable for the following reasons: First, where a weight is placed in the shape of a ball on a horse's hoof it has a marked tendency to cause the foot to roll when the horse lifts it up, causing him either to paddle out or in, and in many cases causes the horse to hit his knees when speeding. In the next place the spur is objectionable from the fact that when a horse is speeding he rises off the extreme end of the toe, and where a spur is either attached to the shoe or fastened by means of a hook passing under the hoof and on top of the shoe the horse in rising on the toe to make his stride is sure to roll on the spur, which will cause him to slip or his hoof to leave the ground in an unnatural position. Again, these round weights are found very objectionable, from the fact that a horse in the act of trotting fast puts the hind foot in many cases directly under the forward foot, and in such cases the hind foot is sure to come in contact with the spur or weight where it projects any considerable distance beyond the front of the hoof. In my device the weight, which is an elongated flat one, is distributed around the foot at any desired distance, which prevents the rolling motion caused by other weights. Then, again, there is no spur on which the horse can slip or roll when rising on his toe when at extreme speed. The plate which I fasten to the hoof is flat on its outer surface and has no projections to catch into the straw or bedding or grass, as the case may be, and the plate can remain on the foot as long as necessary without inconvenience. Again, any desired weight can be put on this plate without increasing the projection in front, and from the fact that this weight and plate lie close to the foot and extend around, instead of up and down, the weight can also be placed anywhere on the hoof without causing the horse to hit himself. The plate is made concaved to fit the shape of the hoof, as shown in the drawings; but as there are no two horses' hoofs just alike it is impossible to make a plate which will fit all hoofs. Therefore I make the plate so thin that it can readily be bent to fit any shaped hoof. This allows the weight to be placed at or near the lower edge of the hoof without the horse hitting it with his hind hoofs or rolling on the toe when rising on the toe. The plate being constructed so thin, can be screwed to the rim of the hoof, where there is no danger of injuring the hoof, which is not the case when a weight is fastened on a spur, because it must be placed high up on the hoof in order to prevent coming in contact with the ground when rising on the toe and when the spur is so placed rests on the sensitive part of the hoof and very frequently causes soreness of the hoof and lameness of the horse.

It is evident that changes in the construction and relative arrangement of the several parts might be made without avoiding my invention, and hence I would have it understood that I do not restrict myself to the particular construction and arrangement of parts shown and described; but, Having fully described my invention, what I claim as new, and desire to secure by Letters Patent, is—

1. A toe-weight consisting of a grooved plate shaped to fit the hoof and provided with holes for the reception of screws for attaching said plate to the hoof, and a weight adapted to enter the groove in said plate, the weight being provided with an internally-screw-threaded hole for the reception of a screw, which latter when in place rests in a countersink located in the plate, substantially as set forth.

2. A toe-weight consisting of a flexible plate having a horizontal dovetailed groove and adapted to be fitted to the hoof and provided with holes for the reception of screws for attaching said plate directly to the hoof, and a weight provided with a dovetailed tongue adapted to enter the dovetailed groove in said plate and provided with an internally-screw-threaded hole for the reception of a screw, which latter when in position enters a countersink located in said plate and holds the weight against displacement, substantially as set forth.

In testimony whereof I have signed this specification in the presence of two subscribing witnesses.

CHARLES C. JEROME.

Witnesses:
A. B. ELLIOTT,
GEO. C. JEROME.